3,301,912
POLYALKYLATED BENZENES FROM KETONES
Yu-Tang Hwang, Crystal Lake, William A. Krewer, Arlington Heights, and Walter J. Sandner, Crystal Lake, Ill., assignors to Union Oil Company of California, Los Angeles, Calif., a corporation of California
No Drawing. Filed Oct. 1, 1965, Ser. No. 492,284
12 Claims. (Cl. 260—668)

This invention relates to a process for the preparation of polyalkylated benzenes, and more particularly to a process for preparing 1,3,5-trimethylbenzene from acetone.

The reaction of ketones to prepare polyalkylated benzenes is known to be promoted by the presence of a variety of catalytic materials, particularly mineral acids such as sulfuric acid. One effective catalyst is tantalum oxide on silica. Another is a combined hydrogen halide and alumina composition with platinum. In fact, a variety of oxides of the elements, especially those members of the left-hand column of Group VI of the Periodic Table, have been tried for this reaction with differing degrees of success. One of the drawbacks of the prior art processes is low conversion rate and the production of mesityl oxide. Yields in the order of 10–20% based on the weight of ketone reacted are reported using such catalysts as chromium oxide and magnesium oxide on alumina.

In accordance with this invention, the discovery has been made that the catalyst system composed of palladium-molybdenum oxide-alumina is effective for the conversion of ketones to polyalkylated benzenes. In one embodiment of this invention ketones are converted to polyalkylated benzenes in the presence of a catalyst system composed of palladium-molybdenum oxide-alumina at a temperature of about 400° to about 900° F. (about 204° C. to about 482° C.) at pressures ranging from about 0 p.s.i.g. to 600 p.s.i.g. with or without hydrogen being present. A feature of this invention is the discovery that acetone is converted to high yields of mesitylene under the afore-stated conditions, and particularly with a catalyst which consists of about 0.1 to 1.0 wt. percent of palladium coated by deposition on pellets, preferably about ⅛ to ¼ inch sizes, composed of about 1.0 to 10.0 wt. percent of molybdenum oxide and about 90% to about 99 wt. percent of alumina.

An object of this invention is, accordingly, the provision of a process for condensing a ketone to produce a substantial yield of a polyalkylbenzene.

Another object of this invention is to provide a process for producing high yields of mesitylene from acetone.

Another object of this invention is to provide a process for condensing ketones to substantial yields of polyalkylbenzenes in a single-step vapor-phase catalytic system employing as the catalyst about 0.1% to about 1.0% by wt. of palladium, about 1.0% to 10.0% by wt. of molybdenum oxide ($MoO_3$) and about 90% to about 99 wt. percent of alumina ($Al_2O_3$).

A further object of this invention is to provide a novel catalytic system for the conversion of ketones into unsaturated carbonyl compounds of higher molecular weight along with a preparation of polyalkylbenzenes particularly trialkylbenzenes, the catalyst system comprising Pd-$MoO_3$-$Al_2O_3$, at a temperature of about 400° F. to about 900° F. and pressures in the order of 0 p.s.i.g. to 600 p.s.i.g., with or without the presence of hydrogen.

These and further objects of this invention will be described and become apparent as the specification proceeds.

The polyalkylated benzenes of this invention are in general useful as solvents and vehicles for many industrial products because of their ability to dissolve aromatic hydrocarbons, alcohols, ethers, esters, various resins, crude oil, vegetable oils, gums, including gums in the carburetors of internal combustion engines, and are also useful in lacquers. One of the more important polyalkylated benzenes, 1,3,5-trimethylbenzene, commonly called mesitylene, is a colorless liquid having a specific gravity of 0.863, a melting point of −52.7° C., and a boiling point of 164.6° C., being insoluble in water and soluble in alcohol and ether, and sharing the foregoing uses plus being a valuable chemical intermediate.

The feature of this invention is the catalyst composition and its form of composition. This catalyst is an alumina-molybdena composite to which has been applied a film or coating of palladium. The composite is prepared by slurrying the blend of alumina and molybdena in a liquid carrier such as water. The blend is then dried and crushed to powder form, pelleted or otherwise shaped, and calcined at a temperature of about 1000° F. to 2000° F.

After the formed composite is cooled, a coating of palladium is applied by various means known in the art, for example, the palladium salt is chemically reduced to form a metal deposit on the composite pellets. The coating or film of palladium can also be applied by vapor deposition, electro-deposition or other methods known to the art.

The ratio of $MoO_3$ to $Al_2O_3$ in the composite and the amount of palladium applied thereto are critical to the efficiency of the catalytic action found herein. In general, satisfactory results are obtained using a composite of about 1.0 to 10.0 wt. percent of $MoO_3$ and about 90% to about 99 wt. percent of $Al_2O_3$. Too low a $MoO_3$ to $Al_2O_3$ ratio is ineffective while too high a $MoO_3$ to $Al_2O_3$ ratio is also undesirable in terms of physical properties and increased cost. Needless to say, such a composite used alone without the requisite amount of palladium is ineffective. The adequate balancing of Pd and $MoO_3$ is critical since the excessive coating of Pd tends to shield off the active sites of $MoO_3$ and alter the nature of catalytic effect.

In order to demonstrate this invention a description will first be given of the method of catalyst preparation followed by the results of a series of experiments showing the comparative efficiency thereof.

The catalyst used in accordance with this invention is prepared as follows: In a typical example, 5 wt. percent $MoO_3$ and 95 wt. percent of $Al_2O_3$ were blended with enough water to make a uniform slurry. After having been dried at 230° F., the solid mass was crushed and made into ⅛ inch pellets, and the pellets were calcined at either 1100° F. or 1950° F. Palladium (about 0.25%) was then coated on these pellets by reduction with formaldehyde from a potassium chloride solution of palladium chloride. Acetone and a hydrogen stream were then passed through a fixed bed of the catalyst where the acetone was converted primarily into mesitylene and other byproducts. The reaction mixture was partially condensed and separated into gas and liquid products. Gas chromatography was used for analyses of the liquid products and mass spectrometry for analyses of the gaseous products.

Results of nine typical runs with catalysts prepared in three different ways are summarized in Table I.

TABLE I.—CONVERSION OF ACETONE TO MESITYLENE

| Catalyst No.[1] | 1 | | | 2 | | | 3 | | |
|---|---|---|---|---|---|---|---|---|---|
| Run No | 1 | 2 | 3 | 4 | 5 | 6 | 7 | 8 | 9 |
| Catalyst Age, hrs | 27-9 | 32-4 | 36-8 | 18-20 | 27-9 | 36-8 | 28-30 | 37-9 | 44-6 |
| Max. Temp., °F | 491 | 542 | 543 | 379 | 483 | 537 | 491 | 492 | 550 |
| Average Temp., °F | 488 | 540 | 541 | 378 | 481 | 536 | 485 | 488 | 542 |
| Pressure, p.s.i.g | 400 | 400 | 400 | 400 | 400 | 400 | 400 | 400 | 400 |
| Acetone, LVHSV | 0.99 | 1.00 | 1.00 | 1.00 | 1.01 | 1.00 | 0.98 | 2.00 | 1.99 |
| $H_2$/acetone wt. ratio | 0.031 | 0.031 | 0.031 | 0.031 | 0.030 | 0.031 | 0.031 | 0.031 | 0.031 |
| Material Recovery, Percent [2] | 97.7 | 100.0 | 98.9 | 101.9 | 97.2 | 98.4 | 101.1 | 98.6 | 100.6 |
| Conversion, percent based on acetone | 32.7 | 42.5 | 32.0 | 20.4 | 27.0 | 35.2 | 16.2 | 31.3 | 26.2 |
| Selectivities, percent based on acetone: | | | | | | | | | |
| MIBK | 3.6 | 3.9 | 0.4 | 8.3 | 1.3 | 0.6 | 15.7 | 3.0 | 5.4 |
| DIBK | | | | | | | 0.4 | | |
| MIBC | | 0.2 | 0.4 | | | 0.6 | | | 0.4 |
| IPA | 0.3 | 0.8 | 0.6 | 0.5 | 0.7 | 0.3 | 1.7 | 0.3 | 0.3 |
| Mesityl Oxide | 9.5 | 4.8 | 6.8 | 25.3 | 12.0 | 7.0 | 7.2 | 12.3 | 8.6 |
| Mesitylene | 38.4 | 44.2 | 55.1 | 15.5 | 12.6 | 31.3 | 30.5 | 27.7 | 48.5 |
| Others [3] | 48.2 | 46.1 | 36.7 | 50.4 | 73.4 | 60.2 | 44.5 | 56.7 | 36.8 |

[1] Catalyst No. 1: 0.25% Pd on a carrier composed fo 5% $MoO_3$ and 95% $Al_2O_3$ (carrier calcined at 1,950° F.).
Catalyst No. 2: 0.25% Pd on a carrier composed of 5% $MoO_3$ and 95% $Al_2O_3$ (carrier calcined at 1,100° F.).
Catalyst No. 3: 0.5% Pd on a carrier composed of 5% $MoO_3$ and 95% $Al_2O_3$ (carrier calcined at 1,950° F.).
[2] Apparent gain or loss has been accounted for on a pro-rated basis.
[3] Obtained by difference. Therefore, probable errors in determination of MIBK, DIBK, etc. should have been reflected in these figures.

To establish that $MoO_3$ alone cannot be regarded as a satisfactory catalyst, such a catalyst prepared by a similar procedure but without Pd coating, was also tested. The typical results are summarized in Table II.

TABLE II.—CONVERSION OF ACETONE TO MESITYLENE

| Catalyst No.[1] | 4 | | | | | | |
|---|---|---|---|---|---|---|---|
| Run No | 10 | 11 | 12 | 13 | 14 | 15 | 16 |
| Catalyst Age, hrs | 8-10 | 14-6 | 30-2 | 40-2 | 52-4 | 66-8 | 74-6 |
| Max. Temp., °F | 451 | 451 | 449 | 524 | 523 | 597 | 597 |
| Average Temp., °F | 450 | 450 | 448 | 523 | 522 | 595 | 596 |
| Pressure, p.s.i.g | 400 | 400 | 400 | 400 | 400 | 400 | 400 |
| Acetone, LVHSV | 4.0 | 3.98 | 2.4 | 1.97 | 0.98 | 0.95 | 2.0 |
| $H_2$/acetone wt. ratio | 0.008 | 0.018 | 0.015 | 0.019 | 0.018 | 0.018 | 0.019 |
| Material Recovery, percent [2] | 995 | 99.0 | 97.6 | 105.4 | 93.3 | 98.0 | 100.4 |
| Conversion, percent based on acetone | 0.7 | 00.4 | 1.3 | 2.5 | 5.6 | 8.4 | 4.4 |
| Selectivities, percent based on acetone (averaged over the period specified): | | | | | | | |
| MIBK | | | | | | 1.4 | |
| DIBK | | | | | | | |
| MIBC | | | | | | | |
| IPA | | | 7.3 | 3.9 | 3.4 | 9.2 | 19.7 |
| Mesityl Oxide | ? | ? | 44.7 | 57.5 | 69.6 | 53.9 | 56.3 |
| Mesitylene | | | | | | 17.4 | 3.3 |
| Others | ? | ? | 48.0 | 38.6 | 27.0 | 18.1 | 20.7 |

[1] Catalyst No. 4: 5% $MoO_3$ and 95% $Al_2O_3$ calcined at 2,000° F.
[2] Apparent gain or loss has been accounted for on a pro-rated basis.
[3] Obtained by difference. Therefore, probable errors in determination of MIBK, DIBK, etc. should have been reflected in these figures.

Stoichiometrically, hydrogen is not needed in the conversion of acetone to mesitylene, but it appears that hydrogen does help to keep the catalyst in an active condition. Operating temperatures in the examples cited only run up to 550° F. but a clear tendency is observed that much higher temperatures should enhance the selectivity to mesitylene as well as conversion per pass. The upper limit in temperature is to be imposed in consideration of thermal cracking of the products as well as the reactant. Pressures are not very critical to the end results.

The process of this invention can be carried out in any suitable manner and may comprise either a batch or continuous type operation. When the reaction is conducted batch-wise, a quantity of the ketone and the catalyst is placed in an appropriate reaction vessel equipped with both heating and mixing means. For this purpose an autoclave can be used. After introduction of the ketone and catalyst the vessel is sealed and heated to the desired temperature. In addition, an inert gas such as argon, helium, or nitrogen may be introduced into the vessel at super atmospheric pressure. As heretofore mentioned, the presence of hydrogen appears to maintain the catalyst activity. Thus, hydrogen can be used in place of the inert gas. After the reaction has been completed or the desired residence time has expired, the reaction vessel and its contents are cooled to room temperature and the desired polyalkylated benzene is separated from the unreacted starting material and other byproducts by fractionation, distillation, crystallization or by the application of a suitable solvent.

The reaction of this invention may be carried out in a continuous type of operation wherein the ketone is continuously withdrawn from the reactor and separated from the unreacted materials, if any, by conventional means mentioned heretofore. Any unreacted ketone can be recycled to form a portion of the feed stock entering the continuous system.

Suitable ketones to be used in the process of this invention comprise ketones of the formula

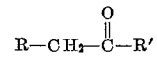

wherein R is a member of the group consisting of hydrogen and hydrocarbon radicals of both alkyl and aryl configurations, and R' is a member of the group consisting of hydrocarbon radicals of alkyl and aryl configurations. R and R' may be the same or different radicals. As a specific embodiment of this invention R can be a member of the group consisting of hydrogen, $C_1$-$C_{20}$ alkyl and $C_6$-$C_{20}$ aryl; while R' can be the same as R except that R' cannot be hydrogen. One preferred group of ketones to be used in accordance with this invention comprises those wherein R is hydrogen and R' is a $C_1$-$C_{20}$ alkyl or $C_6$-$C_{20}$ aryl group. Some typical ketone starting materials are as follows: acetone, methyl ethyl ketone, methyl propyl ketone, methyl butyl ketone, diethyl ketone, ethyl propyl ketone, ethyl butyl ketone, dipropyl ketone, propyl butyl ketone, diisopropyl ketone, isopropyl butyl ketone, dibutyl ketone, diisobutyl ketone and the like; or acetophenone, ethyl phenyl ketone, propyl phenyl ketone, butyl phenyl ketone, and dibenzyl ketone.

When acetone is used as the reactant in the process of the instant invention, the polyalkylated benzene compound which is formed is 1,3,5-trimethylbenzene (mesitylene). The principal product obtained from methyl ethyl ketone is 1,3,5-triethylbenzene. When acetophenone is the reactant the primary product is 1,3,5-triphenylbenzene.

The embodiments of the invention in which an exclusive property or privilege is claimed are defined as follows:

1. The process for the preparation of a polyalkylated benzene compound which comprises condensing a ketone at a temperature of about 400° to about 900° F. in the presence of a catalyst comprising (1) a composite aluminamolybdena and (2) palladium.

2. The process for the preparation of a polyalkylated benzene compound which comprises condensing a ketone at a temperature of about 400° to about 900° F. in the presence of a catalyst system composed of (1) a composite of about 1.0% to 10.0% by wt. of molybdena and about 90% to about 99 wt. percent of alumina, and (2) about 0.1% to about 1.0% by wt. of palladium.

3. The process of producing an unsaturated carbonyl compound and a polyalkylbenzene compound comprising condensing a methyl ketone, at a temperature of at least about 400° F., in the presence of a catalyst comprising (1) a composite alumina-molybdena, and (2) palladium.

4. A process for the preparation of a polyalkylated benzene compound which comprises reacting a ketone of the formula

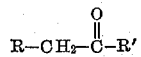

wherein R is a member of the group consisting of hydrogen, alkyl and aryl radicals and R' is a member of the group consisting of alkyl and aryl radicals in the presence of a composite alumina-molybdena and palladium catalyst.

5. A process in accordance with claim 4 in which said composite catalyst comprises (1) about 1.0% to about 10.0% by wt. of molybdena and about 90% to about 99 wt. percent of alumina, and (2) about 0.1% to about 1.0% by wt. of palladium based on the combined weight of said composite and said palladium.

6. A process in accordance with claim 4 in which said reaction is conducted at a temperature of at least about 400° F.

7. A process in accordance with claim 4 in which R is hydrogen and R' is methyl and one of the primary products is 1,3,5-trimethylbenzene.

8. A process for the preparation of 1,3,5-trimethylbenzene which comprises reacting acetone in the presence of a catalyst comprising a composite alumina-molybdena and palladium.

9. A process for the preparation of 1,3,5-triethylbenzene which comprises reacting methyl ethyl ketone in the presence of a catalyst comprising a composite aluminamolybdena and palladium.

10. A process for the preparation of 1,3,5-trimethylbenzene which comprises reacting acetone in the presence of a composite of about 95% by wt. alumina, and about 5.0% by wt. of molybdena with about 0.25% of palladium based on the combined weight of said composite and palladium at a temperature of about 480° F. to 545° F. and a pressure of about 400 p.s.i.g. using an acetone liquid hourly space velocity of about 1.0.

11. A process for the preparation of 1,3,5-trimethylbenzene which comprises reacting acetone in the presence of a catalyst consisting essentially of (1) a composite of about 95 wt. percent of alumina and about 5% by wt. of molybdena and (2) about 0.1 to about 1.0% by wt. of palladium based on the combined weight of said composite and said palladium, wherein before said palladium is added to said composite, said composite is calcined to an elevated temperature not exceeding about 1950° F., and in the presence of hydrogen, at a temperature of about 540° F. and a pressure of about 400 p.s.i.g., using an acetone liquid hourly space velocity of about 1.0.

12. The process in accordance with claim 11 in which the composite carrier has been previously calcined at a temperature of about 1100° F.

References Cited by the Examiner
UNITED STATES PATENTS

| 2,404,914 | 7/1946 | Mattox | 260—668 |
| 2,429,361 | 10/1947 | Linn et al. | 260—586 |
| 2,833,833 | 5/1958 | Schmerling | 260—668 |

DELBERT E. GANTZ, *Primary Examiner.*

C. R. DAVIS, *Assistant Examiner.*